(12) United States Patent
Sakamoto et al.

(10) Patent No.: US 8,021,220 B2
(45) Date of Patent: Sep. 20, 2011

(54) SHOOTING GAME APPARATUS, STORAGE MEDIUM STORING A SHOOTING GAME PROGRAM, AND TARGET CONTROL METHOD

(75) Inventors: Yoshio Sakamoto, Kyoto (JP); Katsuya Yamano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1281 days.

(21) Appl. No.: 11/047,818

(22) Filed: Feb. 2, 2005

(65) Prior Publication Data

US 2005/0176503 A1 Aug. 11, 2005

(30) Foreign Application Priority Data

Feb. 5, 2004 (JP) .................................. 2004-028782

(51) Int. Cl.
*A63F 13/00* (2006.01)
*A63F 13/06* (2006.01)
*A63F 9/24* (2006.01)
*A63F 13/10* (2006.01)

(52) U.S. Cl. .................. 463/5; 463/7; 463/31; 463/50; 463/53; 273/317.1; 273/333; 273/348; 273/461; 434/23

(58) Field of Classification Search .................. 463/2–8, 463/20, 23, 30–32, 34, 36–37, 42–43, 46–47, 463/50, 53, 56, 58–69; 273/127 R, 127 A, 273/150, 317.1, 331, 333, 336, 329–330, 273/340, 348, 349, 351, 354–355, 359, 361–368, 273/378, 386–390, 402–408, 460–461; 434/11–27
See application file for complete search history.

(56) References Cited

U.S. PATENT DOCUMENTS

| 5,299,810 | A | * | 4/1994 | Pierce et al. | 463/2 |
| 5,310,192 | A | * | 5/1994 | Miyake | 463/5 |
| 5,853,324 | A | * | 12/1998 | Kami et al. | 463/2 |
| 6,146,278 | A | * | 11/2000 | Kobayashi | 463/53 |
| 6,210,273 | B1 | * | 4/2001 | Matsuno | 463/8 |
| 6,251,011 | B1 | * | 6/2001 | Yamazaki | 463/2 |
| 6,254,394 | B1 | * | 7/2001 | Draper et al. | 434/11 |

(Continued)

FOREIGN PATENT DOCUMENTS

EP 1 362 622 11/2003

(Continued)

OTHER PUBLICATIONS

Japanese Office Action issued for corresponding Japanese Patent Application No. 2004-028782, dated Mar. 25, 2008.

(Continued)

*Primary Examiner* — Arthur O. Hall
(74) *Attorney, Agent, or Firm* — Nixon & Vanderhye P.C.

(57) ABSTRACT

A shooting game apparatus includes an LCD for displaying a target and an operating button for a player to perform an operation for shooting the target. For example, an enemy character is switched between an ineffective state in which it is never damaged even if an attack hits it, and an effective state in which it is damaged if an attack hits it. Different images are displayed depending on whether the target is in the ineffective state or in the effective state. In a case where the target is in the effective state, when a player character enters into a state of being continuously damaged because it is positioned an area where it receives continuous damage, for example, the target is switched into the ineffective state.

19 Claims, 7 Drawing Sheets

U.S. PATENT DOCUMENTS

| | | | |
|---|---|---|---|
| 6,283,861 B1 * | 9/2001 | Kawai et al. | 463/43 |
| 6,306,036 B1 | 10/2001 | Burns et al. | |
| 6,319,119 B1 * | 11/2001 | Konoe et al. | 463/2 |
| 6,347,994 B1 * | 2/2002 | Yoshikawa et al. | 463/7 |
| 6,409,604 B1 * | 6/2002 | Matsuno | 463/43 |
| 6,664,965 B1 * | 12/2003 | Yamamoto et al. | 345/473 |
| 6,821,206 B1 * | 11/2004 | Ishida et al. | 463/43 |
| 7,033,275 B1 * | 4/2006 | Endo et al. | 463/33 |
| 7,059,962 B2 * | 6/2006 | Watashiba | 463/2 |
| 7,281,981 B2 * | 10/2007 | Yotoriyama | 463/32 |
| 2001/0003708 A1 * | 6/2001 | Aizu et al. | 463/7 |
| 2001/0027129 A1 * | 10/2001 | Harima | 463/32 |
| 2002/0103031 A1 * | 8/2002 | Neveu et al. | 463/49 |
| 2002/0165027 A1 * | 11/2002 | Kaminagayoshi | 463/43 |
| 2004/0104912 A1 * | 6/2004 | Yamamoto et al. | 345/473 |
| 2005/0052450 A1 * | 3/2005 | Koizumi et al. | 345/419 |

FOREIGN PATENT DOCUMENTS

| | | | |
|---|---|---|---|
| JP | 11-300036 | | 11/1999 |
| JP | 2000084255 A | * | 3/2000 |
| JP | 2000084256 A | * | 3/2000 |
| JP | 2000-210470 A | | 8/2000 |
| JP | 3262769 | | 12/2001 |
| JP | 3262770 | | 12/2001 |

OTHER PUBLICATIONS

"Rock Man Dash, Haganeno Boukensin, Hiisyo Koryakuhou, Nintendo 64 kanpeki kouryaku series ▲23 ▼," Fighting Studio, 1st ed., Japan, Futaba Co., Ltd., pp. 10-15, 35, Dec. 30, 2000.

"Parasite Eve 2, Dengeki PlayStation," vol. 6, No. 1, Media Works, Japan, p. 57, Jan. 14, 2000.

Sike, et al., "Jikuusensi Turok, Official Guide Book," 1st ed., Ascii Co., Ltd., Japan, Jun. 13, 1997.

"Devil May Cry 2, Official Complete Guide," Studio Bent Staff, Co., Ltd., Capcom Co., Ltd., Mar. 20, 2003.

Matumoto, "Akumajo Dracula Series, Castlevania Dawn of Sorrow, Official Guide Book Complete Version, Konami Kanpeki Kouryaku Series ▲95▼," 1st ed., Japan, Konami Co., Ltd., Jun. 15, 2003.

"Nintendo Game Cube Books, Sonic Adventure DX, Complete Guide," A One Office Co., Ltd., 1st ed., Japan, SoftBank Publishing, Co., Ltd., Jul. 31, 2003.

"V Jump Books (game series) Game Cube Version, The Legend of Zelda, Wind Walker," Japan, Shueisha Co., Ltd., Jan. 29, 2003.

"Konami Official Guide," Konami Perfect Guide Series, Silent Hill 3, Navigation File, 2003.

* cited by examiner

SHOOTING GAME APPARATUS, STORAGE MEDIUM STORING A SHOOTING GAME PROGRAM, AND TARGET CONTROL METHOD

FIELD OF THE INVENTION

The exemplary illustrative embodiments herein relate to a shooting game apparatus, a storage medium storing a shooting game program, and a target control method. More specifically, the exemplary illustrative embodiments herein relate to a shooting game apparatus in which a player plays a game by shooting a target (e.g., a vital spot or a weak point of an enemy, etc.) wherein the target switches between an effective state in which the player is allowed to shoot the target, and an ineffective state in which the target is never hit, even if the player shoots it, while adjusting the timing for the shooting operation; a storage medium storing a shooting game program for the game apparatus; and a target control method.

BACKGROUND AND SUMMARY OF THE INVENTION

Conventionally, games called shooting game have been widely known, and a great number of such games have been played. In terms of their types, there is a game in which a player causes a player character he controls to shoot a bullet at an enemy character by operating a controller, and there is a game in which a player shoots a target appearing on a screen by using a gun-shaped controller.

In a game apparatus disclosed in Japanese Patent No. 3262769, for example, in order to shoot an enemy character having a plurality of targets, each of the plurality of targets is assigned a time that elapses before the enemy character disappears after it has been hit. Also, stage effects are provided in such a manner that the enemy character disappears quickly if a bullet hits a vital spot, and that the enemy character disappears slowly if a bullet hits a non-vital spot, for example.

Also, according to a game apparatus disclosed in Japanese Patent No. 3262770, in order to make it possible to shoot an enemy character having a plurality of targets, each of the plurality of targets is assigned a time that elapses before the enemy character disappears after it has been hit, as in the case with the first reference. In addition, stage effects are provided in such a manner that, after a bullet has hit a prescribed target, the more times "additional shooting" is performed to successively shoot other targets, the more quickly the enemy character disappears as compared to the case of only one hit.

In both patent documents, however, when the player discovers the enemy character under cover and shoots a bullet at the target in the effective state, for example, he may also be shot and suffer damage. At this time, the player normally should recover from the damage before moving and shooting at the next enemy character. Nevertheless, the player sometimes forces himself to continuously shoot the enemy character while being damaged because this is a chance to attack the enemy character with the target in the effective state. Also, even if he is positioned in a place where he may receive damage only due to his presence (such as a barrier zone and a heated floor), when the enemy character appears randomly, the player sometimes takes this as an attacking chance and forces himself to take continuous shots at the enemy character while being continuously damaged.

For this reason, in playing the game, the player may partly feel frustrated and continuously shoot at the enemy character obsessively, even if he is damaged. Accordingly, playing the game may become less enjoyable compared to the original game.

Therefore, it is a feature of an exemplary illustrative embodiment to provide a novel shooting game apparatus, a novel storage medium storing a shooting game program, and a novel target control method.

It is another feature of an exemplary illustrative embodiment to provide a shooting game apparatus, a storage medium storing a shooting game program, and a target control method which makes it possible to feel the original fun of shooting a target in a game of shooting a target that switches between an effective state in which a player is allowed to shoot the target, and an ineffective state in which the target is never hit even if the player shoots it.

A shooting game apparatus according to an exemplary illustrative embodiment is a shooting game apparatus provided with at least a display means and an operating means in which a player plays a game by operating the operating means to shoot a target displayed on the display means. This shooting game apparatus comprises a target state control means, a target image generation means and a player state determination means. The target state control means controls switching of the target between an ineffective state of being never damaged even if an attack hits the same, and an effective state of being damaged if an attack hits the same. The target image generation means displays on the display means an image that is different when the target is in the ineffective state and when the target is in the effective state. The player state determination means determines at least whether or not the player is in a state of being continuously damaged. Additionally, the target state control means switches the target to the ineffective state when the player state determination means determines that the player is in the state of being continuously damaged in the case where the target is in the effective state.

More specifically, a shooting game apparatus (10) according to an exemplary illustrative embodiment comprises a display means (14) and an operating means (16, 18, 20, 22, 24, 26, 28, 42). In this game apparatus, a player plays a shooting game by operating the operating means to shoot a target displayed on the display means. A target state control means (40, 60, S1, S11) controls switching the target between an ineffective state of being never damaged even if an attack hits it, and an effective state of being damaged if an attack hits it. A target image generation means (40, 70) displays an image on the display means that is different when the target is in the ineffective state and when the target is in the effective state. A player state determination means (40, 62, S23, S27) determines at least whether or not the player is in a state of receiving continuous damage. Additionally, a target state control means (S25) switches the target to the ineffective state when the player state determination means determines that the player is in the state of being continuously damaged in a case where the target is in the effective state. According to this game apparatus, therefore, when the player is in the state of continuously suffering damage, the target is brought into the ineffective state and the player's shooting operation would become useless. This provides the player with an opportunity to extricate himself from a situation where he suffers damage, and thus he can focus his energy on escaping from the state of being continuously damaged. Consequently, it becomes possible to allow the player to fully experience the original fun of shooting the target without having feeling frustrated.

In one aspect of an exemplary illustrative embodiment, the game apparatus further comprises a player position storage means (40, 84) for storing at least a position where the player can take a shot in a game space. The player state determination means determines that the player is in the state of continuously receiving damage when the position stored in the player position storage means is a prescribed one. Thus, the target enters into the ineffective state when the player is positioned in such a place as he is continuously damaged, which provides him with an opportunity to move from the place he suffers damage. As a consequence, it is possible to offer the player the original fun of shooting game without causing him to feel frustrated.

In another aspect of an exemplary illustrative embodiment, the game apparatus further comprises a player character generation means and a non-player character generation means. The player character generation means (40, 70) generates and displays a player character (100) on the display means. The non-player character generation means (40, 70) generates and displays a non-player character (102) on the display means. Additionally, the target image generation means displays a target (106) on the non-player character. So, this makes it possible to play a shooting game with the player character and the non-player character such as an enemy character, displayed. The player can determine that an attack against the non-player character is in an effective state or in an ineffective state while keeping an eye on the target displayed on the non-player character. Thus, even when the player character is brought into the state of being continuously damaged, the player can see the non-player character to make sure that it is in the ineffective state. Accordingly, the player can feel safe in concentrating on escaping from the state in which he suffers damage.

In still another aspect of an exemplary illustrative embodiment, the game apparatus further comprises a non-player character position storage means. The non-player character position storage means (40, 86) stores a position of the non-player character in a game space. In addition, the target state control means is activated when a relationship between the position stored in the player position storage means and the position stored in the non-player character position storage means becomes a prescribed one. In this exemplary illustrative embodiment, for example, when the player and the non-player character exist in places of equal height or come close to each other within a range of certain distance, control over switching of the target between the effective and ineffective states is started (S1, S23, S25, S27, S29). Thus, the target is activated only when the player and the non-player character are in a prescribed position relationship, and it is thus possible to increase an interesting factor of the shooting game by adding thrill, and to give consideration to the player so that he does not have to feel frustrated.

A shooting game apparatus according to an exemplary illustrative embodiment is a shooting game apparatus provided with at least a display means and an operating means in which a player plays a game by operating the operating means to shoot a target displayed on the display means. This shooting game apparatus comprises a player character display control means, a non-player character display control means, a player character position storage means, a target state control means, and a target image generation means. The player character display control means displays and controls an image of a player character on the display means, based on input from the operating means. The non-player character display control means displays and controls an image of a non-player character on the display means. The player character position storage means stores a position of the player character in a game space. The target state control means controls switching the target between an ineffective state of being never damaged even if an attack hits it, and an effective state of being damaged if an attack hits it. The target image generation means displays an image on the non-player character that is different when the target in the ineffective state and when the target is in the effective state. In addition, the target state control means switches the target to the ineffective state when a prescribed position is stored in the player character position storage means in a case where the target is in the effective state.

More specifically, as in case of the above described exemplary illustrative game apparatus, a shooting game is played with the player character and the non-player character displayed, and the target is displayed on the non-player character. Then, when the prescribed position is stored in the player character position storage means (40, 84) in a case where the target is in the effective state, the target is switched to the ineffective state. Thus, according to this game apparatus, since the target is switched to the ineffective state when the player character is located in the prescribed position, the player is given an opportunity to move from the prescribed position. Consequently, as in the case of the above noted game apparatus, it is possible to make the player experience the original pleasure of shooting the target to the full extent without becoming irritated.

In one aspect of an exemplary illustrative embodiment, the game apparatus further comprises a game field generation means for generating a game field for playing a shooting game in which at least the player character and the non-player character are displayed, and for displaying the same on the display means. The game field generation means (40, 70) generates at least a first area (108) where the player character is continuously damaged and a second area where the player character is never damaged in the game field. When a position included in the first area is stored in the player character position storage means in the case where the target is in the effective state, the target state control means switches the target to the ineffective state. Accordingly, since the target is switched to the ineffective state when the player character is positioned in the first area of the game field and is continuously damaged, the player can concentrate on moving from the first area. This makes it possible to offer the player the original fun of shooting the target without causing him to feel frustrated.

In one exemplary illustrative embodiment, after switching the target into the ineffective state, the target state control means holds the target in the ineffective state until a position included in the second area is stored in the player character position storage means (e.g., until the player character relocates to a place where it never receives any damage). As a consequence, since an attack never enters into the effective state until the player character moves to a place where it is never damaged, the player can feel safe to focus on moving from such a place as he continues to receive damage. It is therefore possible to provide the player with the primary fun of shooting the target without forcing him to become irritated.

A storage medium storing a shooting game program according to an exemplary illustrative embodiment is a storage medium storing a shooting game program for allowing a game apparatus provided with at least a display means, an operating means, and a processing means to function as a shooting game apparatus in which a player plays a game by operating the operating means to shoot a target displayed on the display means. This shooting game program causes a computer of the game apparatus to execute a target state control step, a target image generation step, and a player state determination step. The target state control step controls switching the target between an ineffective state of being never damaged even if an attack hits it, and an effective state of being damaged if an attack hits it. The target image generation step displays an image on the display means that is different when the target is in the ineffective state and when the target is in the effective state. The player state determination step determines at least whether or not the player is in a state of being continuously damaged. Additionally, the target state control step switches the target to the ineffective state when the player state determination step determines that the player is in the state of being continuously damaged when the target is in the effective state.

Like the above described shooting game apparatus, this storage medium storing the shooting game program can switch the target to the ineffective state when the player is in the state of being continuously damaged. This provides the player with an opportunity to escape from the state of receiving damage, which makes it possible to make the player experience the original fun of shooting the target without feeling frustrated.

A target control method according to an exemplary illustrative embodiment is a target control method of controlling a target by a computer of a shooting game apparatus in which a player plays a game by operating an operating means to shoot the target displayed on a display means. This target control method includes a target state control step, a target image generation step, and a player state determination step. In the target state control step, switching of the target is controlled between an ineffective state of being never damaged even if an attack hits it, and an effective state of being damaged if an attack hits it. In the target image generation step, displayed on the display means is an image that is different when the target is in the ineffective state and when the target is in the effective state. In the player state determination step, it is determined at least whether or not the player is in a state of being continuously damaged. Additionally, in the target state control step, the target is switched to the ineffective state when it is determined in the player state determination step that the player is in the state of being continuously damaged when the target is in the effective state.

Like the above described stated shooting game apparatus and the storage medium, this target control method allows the player to fully experience the original enjoyment of the shooting game.

According to an exemplary illustrative embodiment, when the player is in a place where he is continuously damaged or in a state of suffering continuous damage, the target is switched to the ineffective state. Thus no matter how the player makes an attack, the target is never damaged, and so the operation of attacking the target becomes useless. Thus, there arises an opportunity for the player to escape from the situation in which he is continuously damaged. Accordingly, the player can direct his energy towards getting away from a place or a state in which he sustains continuous damage. As a result, it is possible to allow the player to have the original pleasure of shooting the target in the shooting game without having to feel frustrated.

BRIEF DESCRIPTION OF THE DRAWINGS

These and other features and advantages will be better and more completely understood by reference to the following detailed description of exemplary illustrative embodiments in conjunction with the drawings of which.

DETAILED DESCRIPTION

Figure 1:
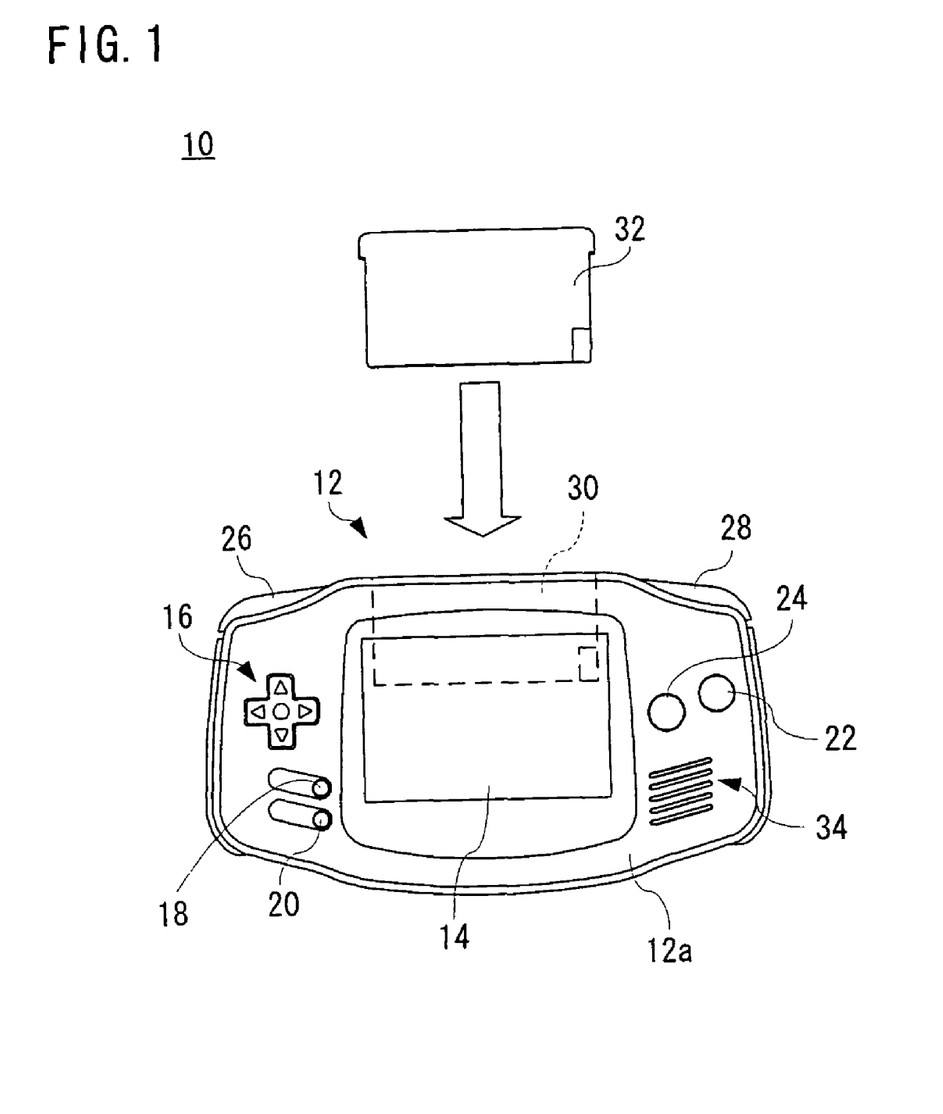
FIG. 1 is an outline view showing a game apparatus of one exemplary illustrative embodiment.

Referring to FIG. 1, a game apparatus 10 of one exemplary illustrative embodiment includes a game machine 12. Such a handheld game machine as a GameBoy Advance can be used as the game machine 12. A color liquid crystal display ("LCD") 14 is provided at the approximate center of a surface of a body (case) 12a of the game machine 12. This LCD 14 displays a game space and game characters such as a player object, etc. existing in the game space, and also supplies messages if required. Also, provided on the surface of the case 12a are operating buttons 16, 18, 20, 22, 24, 26 and 28. The operating buttons 16, 18 and 20 are arranged on left side of the LCD 14, and the operating buttons 22 and 24 are on right side of the LCD 14. In addition, the operating buttons 26 and 28 are arranged on an end surface (upper surface) of upper side (above the LCD 14) of the case 12a.

The operating button 16 is a cross button functioning as a digital joystick. By operating one of its four depressing portions, it becomes possible to specify a movement direction of a game character or to move a cursor displayed on the LCD 14. The operating button 18 is a start button comprising a push button, and is used to give an instruction for starting the game. The operating button 20 is a select button comprising a push button, and is utilized for a selection of a game mode.

The operating button 22 is an A button comprising a push button which allows a player character (player object) displayed on the LCD 14 to take arbitrary actions such as shooting, throwing, grasping, jumping, hopping in, cutting with a sword, and speaking to someone. The operating button 24 is a B button comprising a push button which is used to change the game mode selected by the select button 20 or to cancel the action specified by the A button 22. The operating button 26 is a left push button (L button) comprising a push button, and the operating button 28 is a right push button (R button) comprising a push button. The operating button 26 and the operating button 28 perform same operations as the A button 22 and the B button 24, and also perform operations auxiliary to the A button 22 and the B button 24.

Additionally, an insertion slot 30 is formed on an upper end of the back surface of the case 12a. A game cartridge 32 is inserted into this insertion slot 30. Although not illustrated, a connector 46 and a connector 56 (see FIG. 2) are provided at a rear of the insertion slot 30 and at a forward end of the game cartridge 32 in an insertion direction, respectively. When the game cartridge 32 is inserted into the insertion slot 30, the two connectors are connected with each other. Consequently, the game cartridge 32 becomes accessible from a CPU 40 (see FIG. 2) of the game machine 12.

Also, provided on the surface of the case 12a and below the A button 22 and the B button 24 is a speaker 34 for outputting such sounds as game music (BGM), sound effects and game characters' voices or imitative sounds.

It is noted that, although not illustrated in FIG. 1, the case 12a is provided with an external expansion connector 50 (see FIG. 2) on the top surface thereof, a battery storage box on the back side thereof, a power switch, a volume control knob and an earphone jack on a bottom surface thereof.

Figure 2:
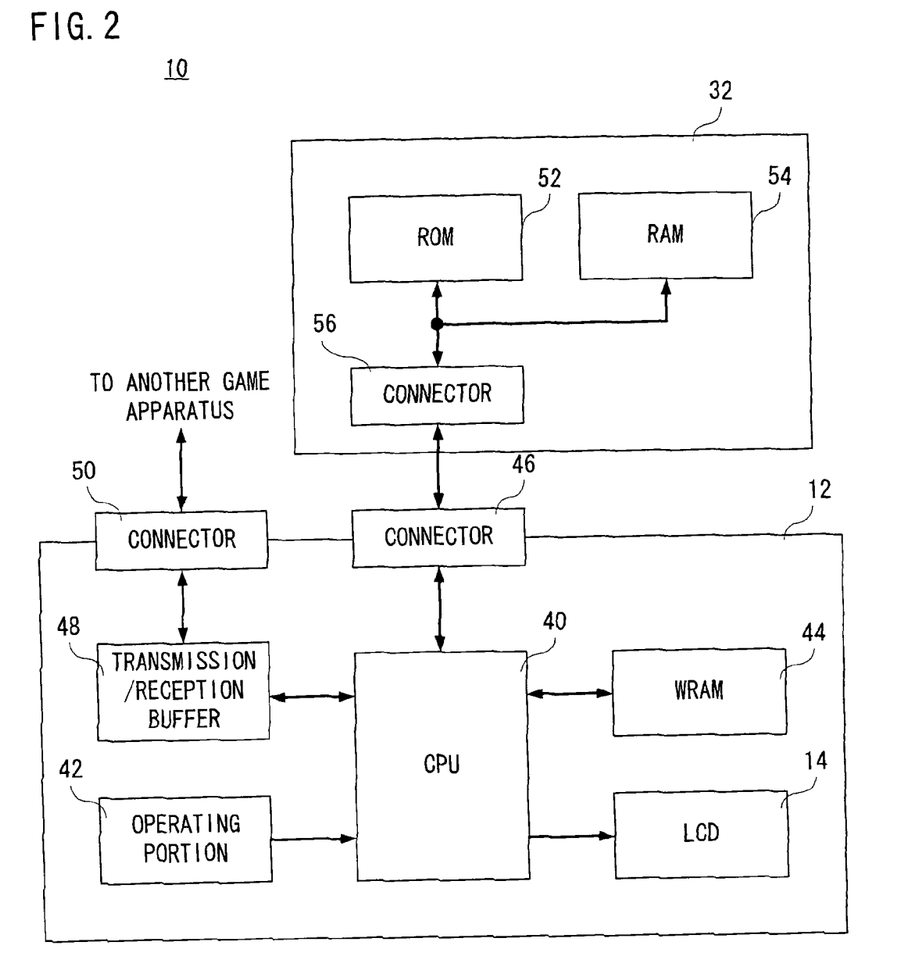
FIG. 2 is a block diagram showing an electrical configuration of the FIG. 1 exemplary illustrative embodiment.

FIG. 2 shows one example of an electric configuration of the game apparatus 10. Referring to FIG. 2, the game machine 12 is provided with the CPU 40 as stated above. This CPU 40 is also called a computer or processor and exercises overall control of the game machine 12. The CPU 40 or computer is connected with the above mentioned LCD 14, an operating portion 42 and a work memory (WRAM) 44 via an internal bus, the connector 46, a transmission/reception buffer 48, etc.

The LCD 14 is supplied with display data from the CPU 40 and displays a game image (game screen). Although not illustrated, the CPU 40 is connected with a VRAM, LCD controller, etc., for example, and renders on the VRAM game image data including background image data and object image data for player object, non-player objects, item objects, etc., according to directions from the CPU 40. Player object (player character) here means a moving image object whose arbitrary actions such as movement are controlled by the operation of the player. Non-player object (non-player character) means a moving image object whose arbitrary actions such as movement are controlled by the computer (CPU 40) instead of the operation of the player. In this exemplary illustrative embodiment, the non-player character includes an enemy character and a target, etc. The LCD controller reads game image data (display data) rendered on the VRAM and displays a game screen on the LCD 14 according to directions from the CPU 40.

The operating portion 42 includes the above mentioned operating buttons 16, 18, 20, 22, 24, 26 and 28. Depending on the operation of these buttons, an operating input signal is provided to the CPU 40. The CPU 40 thus executes a process under a direction supplied from the player (user) through the operating portion 42.

The WRAM 44 is a writable and readable memory used as a work area or a buffer area for the CPU 40. The transmission/reception buffer 48 is intended to temporarily store data sent to or received from another game apparatus 10 or the game machine 12, including, for example, data exchanged during a multiplayer-participating communication game. This buffer is connected to the external expansion connector 50. In order to carry out data communications with the other game apparatus 10, this connector 50 is connected to the other game apparatus 10 via a communication cable (not illustrated).

Additionally, although not illustrated in FIG. 2, the CPU 40 is linked with the speaker 34 shown in FIG. 1 via a sound circuit. When the sound circuit is provided with audio data from the CPU 40, the speaker 34 outputs sounds required for the game such as game music, sound effects, moving image objects' voices or imitative sounds.

The game cartridge 32 includes a ROM 52 and a RAM 54. The ROM 52 and the RAM 54 are connected by a bus to each other and also are connected to the connector 56. As described above, therefore, when the game cartridge 32 is attached to the game machine 12, and the connector 46 and the connector 56 are connected with each other, the CPU 40 is electrically connected to the ROM 52 and the RAM 54. Accordingly, the CPU 40 can read prescribed program data from a prescribed area of the ROM 52 and load it into the WRAM 44, or read prescribed backup data from the RAM 54 and write it into the WRAM 44, or write and save game data generated in the WRAM 44 into a prescribed area of the RAM 54, for example, depending on the progress of the game.

As the RAM 54, a flash memory that is a nonvolatile memory may be employed. Alternatively, a ferroelectric memory (FeRAM), an EEPROM, etc., for example, can be used as other nonvolatile memories. Also, an SRAM and a DRAM powered from a battery can be utilized instead.

Figure 3:
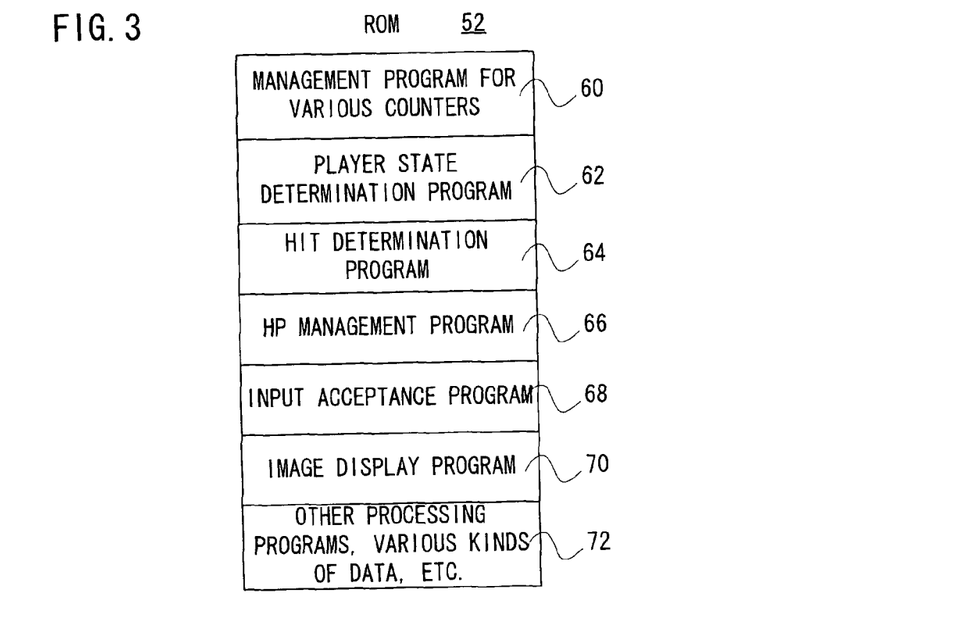
FIG. 3 is a schematic view showing one example of memory map for a ROM in FIG. 2.

FIG. 3 shows one example of a memory map for the ROM 52. Referring to FIG. 3, the ROM 52 stores a management program for various counters 60, a player state determination program 62, a hit determination program 64, an HP (hit point) management program 66, an input acceptance program 68, an image display program 70, etc.

The management program for various counters 60 is a program for managing a target counter and a damage counter. The target counter is a timer for managing a period of time that elapses before an attack against the target is switched to the effective state, and is controlled in accordance with the player's state. The target counter is controlled in a countdown style, for example. In a case where the target counter is not at 0 (zero), when the player character is in a prescribed position where it is never continuously damaged or in a state where it is never continuously damaged, counter control is activated and the target counter is decreased. A target counter value of 0 means that an attack against the target is the effective state. The effective state of an attack against the target means that the target is damaged if a bullet hits it. On the other hand, the ineffective state of an attack against the target means that the target is never damaged, even if a bullet hits it. Additionally, in a case where the target counter is at 0 (the attack effective state), when the player character enters into a continuously disadvantageous situation because it is placed in a prescribed position where it is continuously damaged or in a state where it is continuously damaged, the target counter is reset to a value other than zero, and the target is switched to the attack ineffective state accordingly. When having received continuous damage, the player character is brought into a disadvantageous situation due to a decrease in the number of player HPs and a degradation in fighting capability, for example.

The damage counter is a counter for switching an attack against the target to the ineffective state in a case where the target has suffered a certain degree of damage during a period of time when the attack against the target is effective. In the state where the player's attack is effective, even if it is possible to attack the target successively at one blow, defeating the target straightaway would reduce the fun of the game. Thus this counter is intentionally provided so that the target is deactivated depending on the degree of damage caused to it, with consideration given to maintaining the pleasure of the game. When the target is hit and damaged, the enemy and the target are placed into a disadvantageous situation by decreasing the number of target HPs and the enemy character's fighting power. The damage counter is controlled in a countdown style, for example, and is decreased when an attack hits the target. When the damage counter has reached 0 (zero), the target counter is reset to a value other than zero and the target is switched to the attack ineffective state.

The player state determination program 62 is a program for determining the state of the player, whether or not the player character is in the state of being continuously damaged or whether or not it is in a state suitable for making an attack, based on its position, etc.

The hit determination program 64 is a program for determining whether or not the player character's attack has hit the target, or whether or not the enemy character's attack has hit the player character, etc.

The HP management program 66 is a program for managing hit points of the target and of the player character, etc. HP is a physical strength parameter that determines whether or not the character is capable of continuing a battle. (For example, this indicates the lives of a player character and an enemy character). The number of HPs is decreased every time a character is hit by an attack from the opponent and, when it has reached zero, the character loses a battle.

The input acceptance program 68 is a program for accepting an operating signal from the operating portion 42 that is generated by the player's operation. In addition, the image display program 70 is a program for generating images of the game field, player character, target, enemy character, etc. in accordance with their individual states and for displaying them on the LCD 14.

The ROM 52 is also provided with another area 72 that stores other processing programs and various kinds of data. For example, stored in this area are an audio output program, other programs required for game control, image data, audio data, etc. The image data to be stored includes an image of the enemy character with the target in the effective state; an image of the enemy character with the target in the ineffective state; an image of the player character being damaged; an image of the player character not being damaged; and an image of the background of the game field where the player character and the enemy character are displayed.

Figure 4:
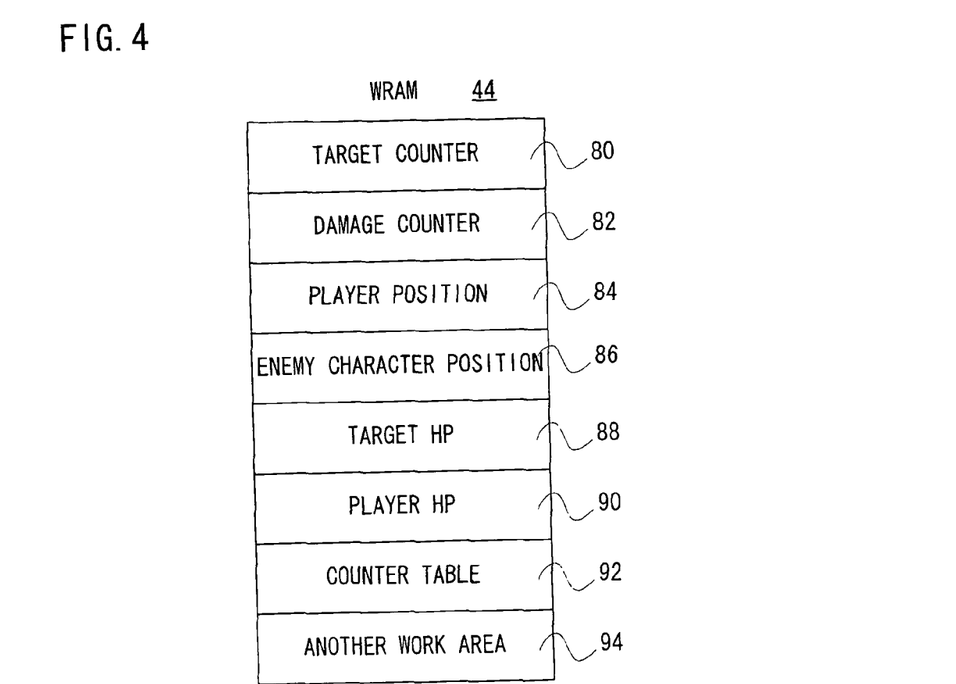
FIG. 4 is a schematic view showing one example of memory map for a WRAM in FIG. 2.

FIG. 4 shows one example of a memory map for the WRAM 44. With reference to FIG. 4, formed in the WRAM 44 are a target counter area 80, a damage counter area 82, a player position area 84, an enemy character position area 86, a target HP area 88, a player HP area 90, a counter table area 92, another work area 94, etc.

The target counter area 80 and the damage counter area 82 store values of the target counter and of the damage counter controlled by the above stated management program for various counters 60, respectively.

The player position area 84 stores coordinate data for the position of the player character in the virtual game space, according to the progress of the game. The player character is generated and displayed in a position based on the position data stored in this area 84. The position stored in the player position area 84 is also a position where the player character can take a shot in the game space.

The enemy character position area 86 stores coordinate data for the position of the enemy character or of the non-player character such as the target which is fighting against the player character in the virtual game space, according to the progress of the game.

The target HP area 88 and the player HP area 90 store the HPs of the target and the HPs of the player character, both of which are controlled by the above stated HP management program 66.

The counter table area 92 stores a table for changing a counter value depending on the situation in resetting the target counter or the damage counter. This makes it possible to change a period of time that elapses before an attack is switched to the effective state and to alter the degree of damage that can be caused to the target until the attack is switched to the ineffective state. Therefore, the game may be more enjoyable.

The other work area 94 is used to perform required calculations, save a value temporarily, etc.

The game apparatus 10 is a shooting game apparatus in which the player plays a game by performing a shooting operation (or shooting action or button operation) to take a shot at the target. The target is switched between the attack effective state in which it is damaged when a bullet hits it, and the attack ineffective state in which it is never damaged even when a bullet hits it, depending on the player's state in the progress of the game. When the target is in the attack effective state, the player shoots a bullet at the target to attack it by operating the operating button 22 or the like, for example.

Figure 5:
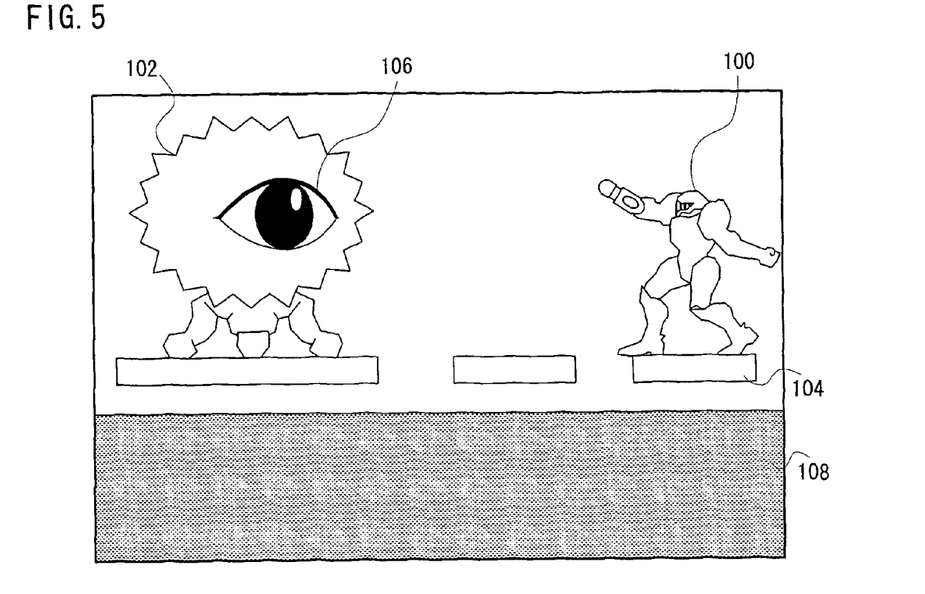
FIG. 5 is a schematic view showing one example of game screen in which an attack against a target is in an effective state.

FIG. 5 shows one example of a game screen with the target in the attack effective state. The game screen of FIG. 5 represents a scene in which a player character 100 and an enemy character 102 are shooting bullets (not illustrated) at each other on a floor 104. Displayed on the enemy character 102 is an image of an open eye 106, as one example of the target. The eye 106 corresponds to a vital spot or weak point of the enemy character 102. The display of the open eye 106 means that the enemy character is in the attack effective state. Therefore, the player can cause damage to the enemy character 102 or the target 106 by shooting a bullet at the target 106 and hitting it in the attack effective state.

In this exemplary illustrative embodiment, when the target counter is at zero and the player character 100 is in a state suitable for making an attack, the target is held in the attack effective state. The state of the player character 100 suitable for making an attack means that the player character 100 is in the state of not being continuously damaged. In this exemplary illustrative embodiment, this state is obtained when the player character 100 is in a position where it does not continuously receive such damage, placing it into a disadvantageous situation. More specifically, in the example of FIG. 5, a damage area 108 is provided below the floor 104 on which the enemy character 102 (the target 106) is located. When falling to the damage area 108, the player character 100 is supposed to continuously suffer damage. Meanwhile, provided above the floor 104 is an area where the player character 100 is never damaged (safe area). Thus, when it is positioned in the safe area, the player character 100 is determined to be in the state suitable for making an attack.

If the player has caused a prescribed degree of damage to the target 106 in the attack effective state, the target is changed to the attack ineffective state. This prevents the game from becoming monotonous due to the continuance of the attack effective state. More specifically, when the player has hit the target 106 with a bullet, the damage counter is decreased. Then, when the damage counter has reached zero, the target counter is reset to a value other than zero and the target is switched to the attack ineffective state.

Figure 6:
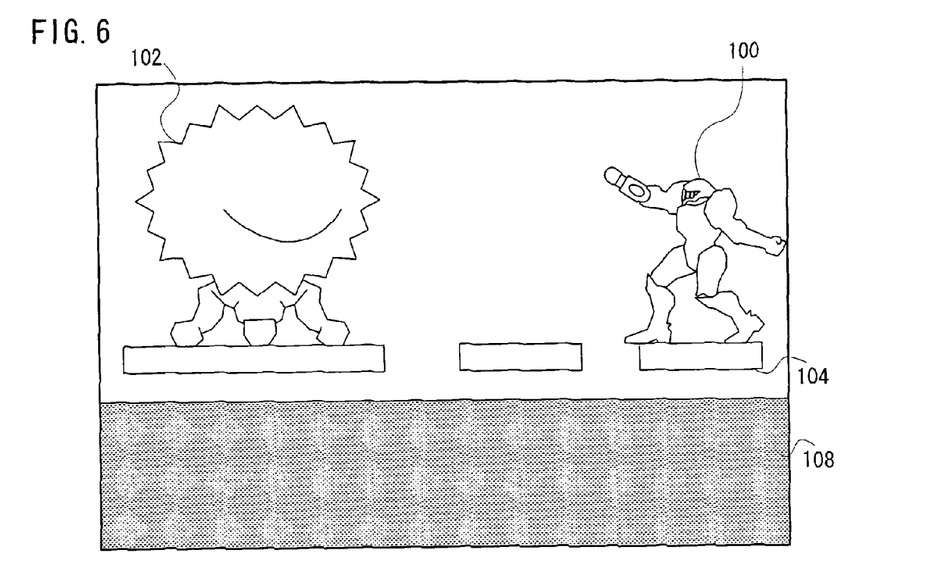
FIG. 6 is a schematic view showing one example of game screen in which an attack against the target is in an ineffective state.

FIG. 6 shows one example of game screen in a case where the target is in the attack ineffective state. In the game screen of FIG. 6, the player character 100 and the enemy character 102 are positioned on the floor 104, as in the case of FIG. 5. However, the image of the enemy character 102 is displayed with the eye closed, that is, the enemy character 102 has no target displayed, which means that the target is in the attack ineffective state. In the attack ineffective state, the enemy character 102 can never be damaged even if a bullet hits it.

Once switched to the attack ineffective state, the target is held in the attack ineffective state until prescribed conditions are fulfilled. In order to get away from the attack ineffective state, the player character 100 needs to be in the state of not suffering continuous damage or in a state suitable for making an attack, for example. In other words, the player character 100 needs to be above the floor 104 in the example of FIG. 6.

Also, in the case where the target counter is not at zero (e.g., the target is in the attack effective state), when the player character 100 enters into the state suitable for carrying out an attack, control is activated to switch an attack against the target 106 to the effective state, and then the target counter is decreased. Thus, when the target is in the attack ineffective state, the player can decrease the target counter value to 0 and switch the target to the attack effective state as shown in FIG. 5, by making the player character 100 remain located on the floor 104, for example.

Alternatively, when being in a prescribed position relationship with the enemy character 102 (e.g. at an equal height, within a certain distance, etc.), it may be possible that the player character 100 is determined to be in the state suitable for making an attack so that it does not receive continuous damage. In the examples of FIG. 5 and FIG. 6, when being positioned at a height equal to or greater than the enemy character 102, the player character 100 exists in the safe area where it is never damaged. Instead of that, it may be possible that the player character 100 is not determined to be in the state suitable for making an attack unless the player character 100 and the enemy character 102 become close to each other within a range of a certain distance. In these cases, the player character 100 enters into the state of not being continuously damaged only when it is located in a position where it can fight against the enemy character 102 on an equal footing or when it becomes close to the enemy character 102 (e.g. within a certain distance). This activates the target switching control (target counter control) and switches an attack against the target to the effective state. With that, it is possible to make the shooting game more enjoyable with added thrill.

On the other hand, when existing in the damage area 108 under the floor 104, the player character 100 is determined to be in the disadvantageous state of receiving continuous damage.

Figure 7:
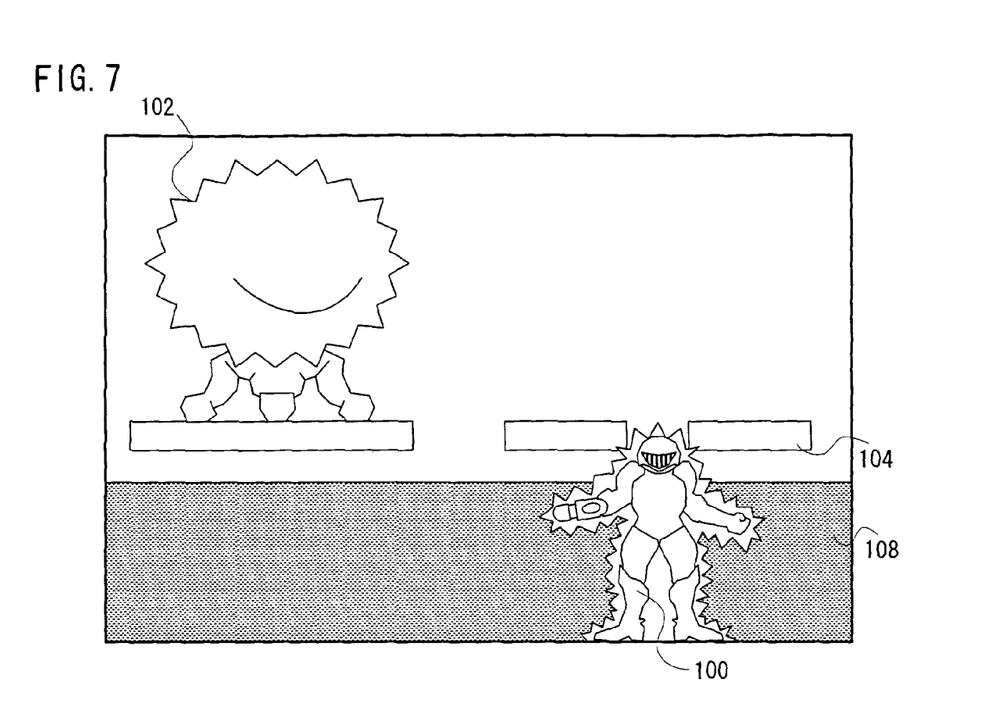
FIG. 7 is a schematic view showing one example of game screen in which a player character is damaged.

FIG. 7 shows one example of game screen with the player character 100 being damaged. In the game screen of FIG. 7, the player character 100 exists in the damage area 108 under the floor 104 and is represented by a damaged image, in contrast to the undamaged images shown in FIG. 5 and FIG. 6.

In the case of the attack effective state (the target counter=0), when the player character 100 has fallen to the damage area 108 and entered in the disadvantageous state of receiving continuous damage, the target counter is reset to a value other than zero and the target is switched to the attack ineffective state. Thus, FIG. 7 uses an image of the enemy character 102 with the eye closed and with the target shown in FIG. 5 not displayed, which means that the target is the attack ineffective state. Thus, the player can determine whether an attack against the enemy character 102 is in the effective state or the ineffective state while keeping an eye on the enemy character 102. Therefore, even when the player character 100 enters the state of being continuously damaged as shown in FIG. 7, the player can make sure that the target is in the ineffective state and feel safe to concentrate on escaping from the state of being damaged.

After that, in order to switch from the attack ineffective state to the attack effective state, the player needs to move the player character 100 to a prescribed position or a position where it is in a prescribed position relationship with the enemy character 102 so that it enters into the state of not being damaged (the state suitable for making an attack), as described above.

In this manner, the target is switched to the attack ineffective state when the player character 100 enters into such a disadvantageous state as being continuously damaged. The target or the enemy character 102 thus can never be damaged even if the player performs an operation of shooting the target, and so the player's shooting operation would become meaningless. In other words, this provides the player with an opportunity to get out of the disadvantageous state of being continuously damaged. Accordingly, even when the player character 100 falls to the damage area 108, the player can focus his energy on returning the player character 100 to the state of not being damaged (the state suitable for making an attack) by extricating the player character 100 from the damage area 108 onto the floor 104. Therefore, this would not force the player to perform a shooting operation while being continuously damaged or make the player feel frustrated, unlike the prior art. As a consequence, it is possible to allow the player to fully experience the original fun of shooting the target in the shooting game.

Figure 8:
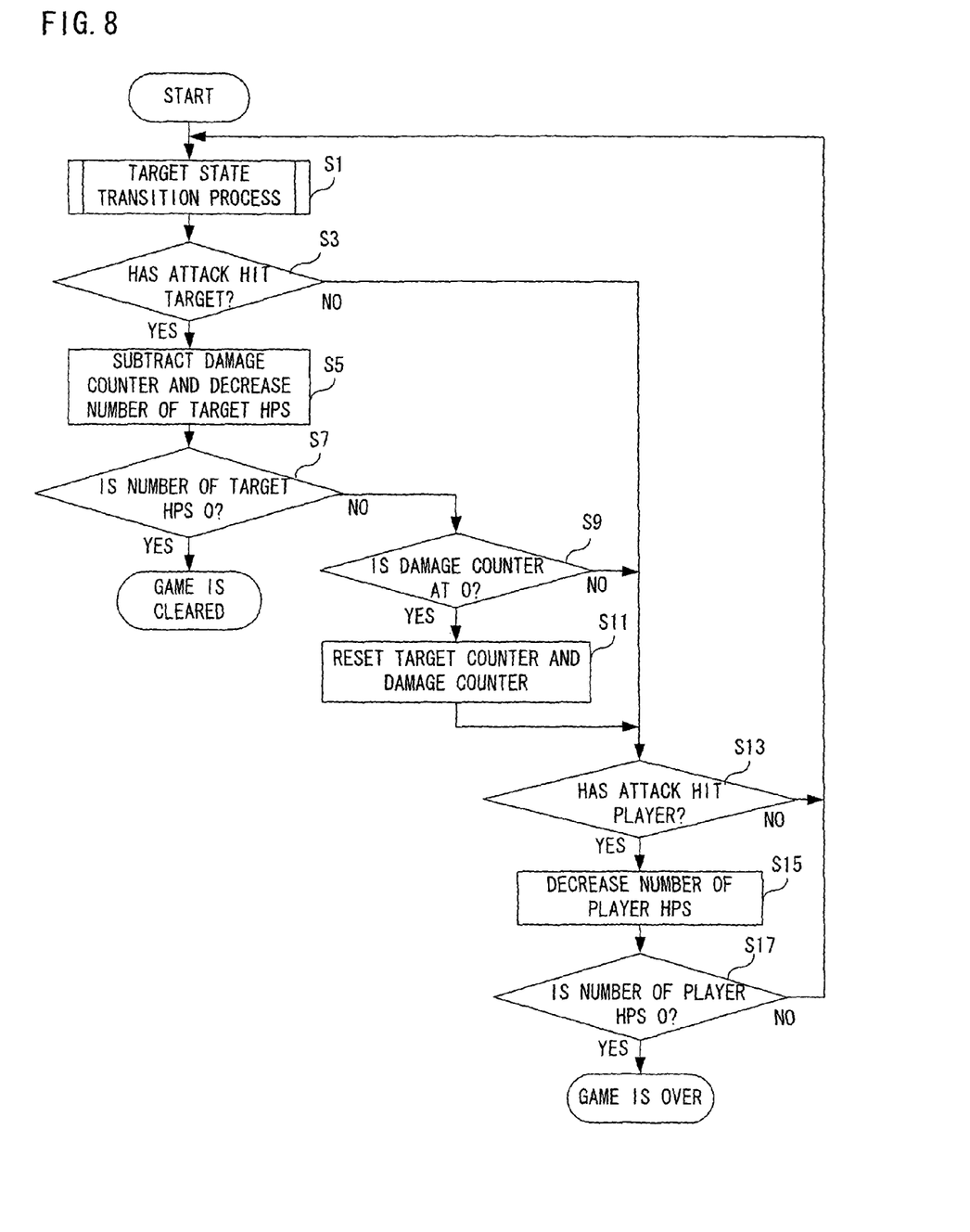
FIG. 8 is a flowchart showing one example of battle-time process in game operation of an exemplary illustrative embodiment.

The exemplary illustrative game operation described above is processed by the CPU 40 of the game apparatus 10 in accordance with an exemplary illustrative flowchart shown in FIG. 8. FIG. 8 shows one of game main processes (a battle-time process). As other main game processes, executed in parallel are a process of obtaining an operating input signal from the operating portion 42, a process of generating a player character based on the operating input signal, a process of generating a non-player character, a process of generating and displaying a game screen, a process of outputting music, etc., for example. However, these are general processes and detailed descriptions are omitted here.

Figure 9:
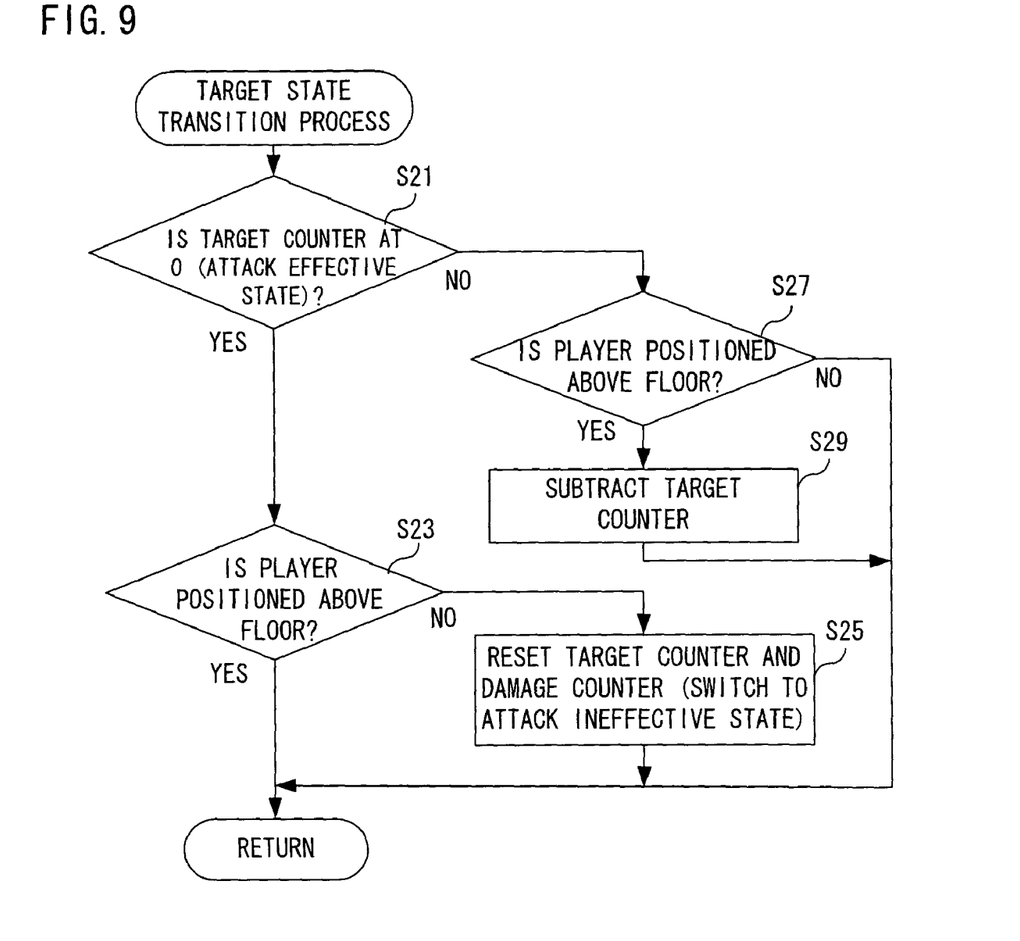
FIG. 9 is a flowchart showing one example of a target state transition process described in FIG. 8.

In step S1 of FIG. 8, the CPU 40 executes a target state transition process and controls switching between the effective and ineffective states of the target depending on the player's state. Details of this process are shown in FIG. 9. In step S21 of FIG. 9, the CPU 40 determines whether the target counter in the target counter area 80 is at zero or not. If "YES" is the result of step S21, that is, if the target is in the attack effective state, the CPU 40 determines in succeeding step S23 whether or not coordinate data in the player position area 84 shows a location above the floor 104 to evaluate the state of the player character 100. That is, the CPU 40 determines whether or not the player character 100 is in the state suitable for carrying out an attack (or whether or not the player character 100 is in the state of being never continuously damaged). If "YES" is the result of step S23, the CPU 40 terminates the target state transition process and returns the process to step S3 of FIG. 8. In this case, the attack effective state is retained since the target counter is at zero and the player exists in a prescribed position where he is never continuously damaged. Then, a game screen is displayed with an image of the target 106 in the effective state as shown in FIG. 5, for example.

On the other hand, if "NO" is the result of step S23, that is, if the player character 100 is in the state not suitable for making an attack, the CPU 40 resets the target counter and the damage counter based on data in the counter table area 92, for example, and writes newly determined values to the target counter area 80 and the damage counter area 82, respectively, in succeeding step S25. In this case, since the player character 100 exists in a prescribed position where it receives continuous damage (e.g., within the damage area 108), the target is switched to the attack ineffective state. Then, as shown in FIG. 7, a game screen including an image of the enemy character with the closed eye indicating the ineffective state and an image of the player character 100 being damaged, etc., for example, is displayed.

Also, if "NO" is the result of step S21, that is, if the target counter is not at zero, the CPU 40 determines in succeeding step S27 whether or not the coordinate data in the player position area 84 shows a location above the floor 104, as in the case with step S23, and evaluates the state of the player character 100. If "NO" is the result of step S27, that is, if the player character 100 is in the damage area and in the state of being continuously damaged, the CPU 40 immediately terminates the target state transition process and returns the process to step S3 of FIG. 8. In this case, the attack ineffective state is retained and such a game screen as shown in FIG. 7 is displayed.

On the other hand, if "YES" is the result of step S27, that is, if the player character 100 is not damaged or is in the state suitable for conducting an attack, the CPU 40 subtracts a prescribed value (e.g. 1) from the target counter and writes an updated value to the target counter area 80 in succeeding step S29. Then, the CPU 40 terminates the state transition process for this target and returns to step S3 of FIG. 8. In this case, although the target is in the attack ineffective state, the player character 100 exists in the position suitable for making an attack and thus the target counter starts counting down to switch the target to the attack effective state. In this case, as shown in FIG. 6, a game screen including an image of the enemy character 102 with the closed eye showing the ineffective state, for example, is displayed.

Returning to FIG. 8, in step S3, the CPU 40 determines whether an attack has hit the target or not. More specifically, the CPU 40 determines whether an attack against the target is in the effective state or the ineffective state based on the value of the target counter, and makes a hit determination between the bullet shot by the player character 100 and the target 106 (the enemy character 102).

If "YES" is the result of step 3, that is, if the target is hit in the attack effective state, the CPU 40 subtracts a prescribed value (e.g. 1) from the damage counter and the number of the target HPs, and writes updated values to the damage counter area 82 and the target HP area 88, respectively, in succeeding step S5. Then, in step S7, the CPU 40 determines whether the number of the target HPs is zero or not. If "YES" is the result, since the target 106 or the enemy character 102 is defeated, the process moves on to a game clear process.

On the other hand, if "NO" is the result of step S7, the CPU 40 determines whether the damage counter is at zero or not in succeeding step S9. If "YES" is the result of step S9, that is, if a prescribed degree of damage is caused to the target 106, the CPU 40 resets the target counter and the damage counter based on data in the counter table area 92, for example, and writes newly determined values to the target counter area 80 and the damage counter area 82, respectively, in succeeding step S11. With this, the target counter is no longer at zero and the target is switched to the attack ineffective state. When step S11 is completed, the process goes to step S13.

Also, if "NO" is the result of step S9, that is, if a prescribed degree of damage is not caused to the target, the process moves directly to step S13.

On the other hand, if "NO" is the result of step S3, that is, if the target is in the attack ineffective state or is not hit in the attack effective state, then the process goes directly to step S13.

In step S13, the CPU 40 determines whether or not an attack from the enemy character 102 has hit the player character 100. More specifically, the CPU 40 makes a hit determination between the bullet shot by the enemy character 102 and the player character 100. If "NO" is the result of step S13, the process returns to step S1.

Also, if "YES" is the result of step S13, the CPU 40 subtracts a prescribed value (e.g. 1) from the number of the player HPs and writes an updated value to the player HP area 90 in succeeding step S15. Then, in step S17, the CPU 40 determines whether the number of the player HPs is zero or not. If "YES" is the result, since the player character 100 is defeated, the CPU 40 performs a game over process. If "NO" is the result of step S17, the process returns to step S1.

In this manner, the game is advanced with the switching of an attack against the target between the effective and ineffective states depending on the state of the player character 100.

When the player character 100 is in such a disadvantageous state as being continuously damaged, an attack against the target is placed into the ineffective state. This relieves the player from such stressful game playing where the player has to continue attacking while being continuously damaged. Therefore, it is possible to provide the player with the original fun of the shooting game.

Regarding the above described exemplary illustrative embodiment, an explanation is given as to the case where the present invention is applied to a shooting game in which the player character 100 operated by the player is displayed on a game screen. In other exemplary illustrative embodiments, however, a shooting game may be played in such a manner that an image from the player's viewpoint is displayed as a game screen without any player character. In this case, the position of the player (viewpoint) in the virtual game space is stored in the player position area 84, as a position where the player takes a shot. Additionally, as in the case with the above stated exemplary illustrative embodiment, it is determined whether or not the player is in a disadvantageous state of being continuously damaged or in a state suitable for conducting an attack, for example, based on the position of the player or a position relationship between the player and the enemy character 102. Depending on the state of the player, an attack against the target is switched between the effective and ineffective states.

Moreover, although a description is provided as to only a hand-held game machine in each of the above exemplary illustrative embodiments, the present invention is not so limited. For example, the present invention is also applicable to a home video game apparatus, a mobile phone with game capabilities, PC, etc. In addition, instead of a game cartridge, it may be possible to employ optical information storage media such as a CD-ROM and a DVD, and various kinds of information storage media such as a magnetic optical disk and a magnetic disk.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A shooting game apparatus, comprising:
   a display;
   a controller configured to be operated by a user to control a player character to shoot a target character displayed on said display;
   target state control programmed logic circuitry configured to control switching of said target character between an ineffective state of being never damaged even if an attack directly hits the target character, and an effective state of being damaged if an attack directly hits the target character;
   a target image generator configured to display on said display an image that is different between when said target character is in the ineffective state and when said target character is in the effective state; and
   player character state determination programmed logic circuitry configured to determine at least whether or not the player character is in a state of being continuously damaged, wherein
   said target state control programmed logic circuitry is configured to switch, without any additional action from the user, said target character to the ineffective state when said player character state determination programmed logic circuitry determines that the player character is in the state of being continuously damaged when said target character is in the effective state.

2. The shooting game apparatus according to claim 1, further comprising:
at least one player character position storage location configured to store at least a position where the player character can take a shot in a game space, wherein
said player character state determination programmed logic circuitry is configured to determine that the player character is in the state of being continuously damaged when a prescribed position is stored in said at least one player character position storage location.

3. The shooting game apparatus according to claim 2, further comprising:
a player character generator configured to generate and display a player character on said display; and
a non-player character generator configured to generate and display a non-player character on said display, wherein
said target image generator is configured to display said target on said non-player character.

4. The shooting game apparatus according to claim 3, further comprising:
at least one non-player character position storage location configured to store a position of said non-player character in the game space, wherein
said target state control programmed logic circuitry is configured to be activated when a prescribed relationship is established between the position stored in said at least one player character position storage location and the position stored in said at least one non-player character position storage location.

5. A shooting game apparatus, comprising:
a display;
a controller configured to be operated by a user to play a game by controlling a player character to shoot a target character displayed on said display;
player character display control programmed logic circuitry configured to display and control an image of a player character on said display, based on input from said controller;
non-player character display control programmed logic circuitry configured to display and control an image of a non-player character on said display;
at least one player character position storage location configured to store a position of said player character in a game space;
target state control programmed logic circuitry configured to control switching of said target character between an ineffective state of being never damaged even if an attack directly hits the target character, and an effective state of being damaged if an attack directly hits the target character; and
a target image generator configured to display an image on said non-player character that is different between a case where said target character is in the ineffective state and a case where said target character is in the effective state that is different between when said target character is in the ineffective state and when, wherein
said target state control programmed logic circuitry is configured to switch, without any additional action from the user, said target character to the ineffective state when a prescribed position is stored in said at least one player character position storage location when said target character is in the effective state.

6. The shooting game apparatus according to claim 5, further comprising:
a game field generator configured to generate a game field for playing a shooting game in which at least said player character and said non-player character are displayed, and configured to display the same on said display, wherein
said game field generator is configured to generate in said game field at least a first area where said player character is continuously damaged and a second area where said player character is never damaged;
said target state control programmed logic circuitry is configured to switch said target character to the ineffective state when a position included in said first area is stored in said at least one player character position storage location when said target character is in the effective state.

7. The shooting game apparatus according to claim 6, wherein
said target state control programmed logic circuitry is configured to hold said target character in the ineffective state until a position included in said second area is stored in said at least one player character position storage location, after switching said target character to the ineffective state.

8. A non-transitory computer-readable storage medium storing a shooting game program for allowing a game apparatus provided with at least a display, a controller, and a processor to function as a shooting game apparatus in which a user plays a game by operating said controller to control a player character to shoot a target character displayed on said display, wherein
said shooting game program causes the processor of said game apparatus to execute:
controlling switching of said target character between an ineffective state of being never damaged even if an attack directly hits the target character, and an effective state of being damaged if an attack directly hits the target character;
displaying an image on said display that is different between when said target character is in the ineffective state and when said target character is in the effective state; and
determining at least whether or not the player character is in a state of being continuously damaged, wherein
said controlling switches, without any additional action from the user, said target character to the ineffective state when said determining determines that the player character is in the state of being continuously damaged when said target is in the effective state.

9. The non-transitory computer-readable storage medium storing a shooting game program according to claim 8, wherein
said shooting game program causes the processor of said game apparatus to further execute storing a position where the player character can take a shot in the game space, wherein
said determining determines that the player character is in the state of being continuously damaged when a prescribed position is stored by a player character position storage.

10. The non-transitory computer-readable storage medium storing a shooting game program according to claim 9, wherein
said shooting game program causes the processor of said game apparatus to further execute:

generating and displaying a player character on said display; and generating and displaying a non-player character on said display, wherein said displaying displays said target on said non-player character.

11. The non-transitory computer-readable storage medium storing a shooting game program according to claim 10, wherein said shooting game program causes the processor of said game apparatus to further execute storing a position of said non-player character in the game space, wherein said controlling is activated when a prescribed relationship is established between the position stored by said storing a position where the player character can take a shot and the position stored by said storing a position of said non-player character.

12. A target control method of controlling a target character by a computer of a shooting game apparatus in which a user plays a game by operating a controller to control a player character to shoot said target character displayed on a display, including:

controlling switching of said target character between an ineffective state of being never damaged even if an attack directly hits the target character, and an effective state of being damaged if an attack directly hits the target character;

displaying an image on said display that is different between when said target character is in the ineffective state and when said target character is in the effective state; and determining, using the computer, at least whether or not the player character is in a state of being continuously damaged, wherein in said controlling, said target character is switched, without any additional action by the user, to the ineffective state when it is determined in said determining that the player character is in the state of being continuously damaged when said target character is in the effective state.

13. The target control method according to claim 12, further including:

storing a position where the player character can take a shot in the game space, wherein it is determined in said determining that the player character is in the state of being continuously damaged when a prescribed position is stored in said storing.

14. The target control method according to claim 13, further including:

generating and displaying a player character on said display; and generating and displaying a non-player character on said display, wherein in said displaying, said target is displayed on said non-player character.

15. The target control method according to claim 14, further including:

storing a position of said non-player character in the game space, wherein said controlling is activated when a prescribed relationship is established between the position stored in said storing a position where the player character can take a shot and the position stored in said storing a position of said non-player character.

16. A game apparatus, comprising:

a display;

a controller configured to be operated by a user to control a player character to attack a target character displayed on said display; and a processor configured to:

control switching of said target character between an ineffective state of being never damaged even if an attack directly hits the target character, and an effective state of being damaged if an attack directly hits the target character;

generate for said display an image that is different between when said target character is in the ineffective state and when said target character is in the effective state;

determine at least whether or not the player character is in a state of being continuously damaged; and switch, without any additional action from the user, said target character to the ineffective state when the player character is determined to be in the state of being continuously damaged when said target character is in the effective state.

17. A game apparatus, comprising:

a display;

a controller configured to be operated by a user to play a game by controlling a player character to attack a target character displayed on said display; and a processor configured to:

display and control an image of a player character on said display, based on input from said controller;

display and control an image of a non-player character on said display;

store, in at least one player character position storage location, a position of said player character in a game space;

control switching of said target character between an ineffective state of being never damaged even if an attack directly hits the target character, and an effective state of being damaged if an attack directly hits the target character; and generate a display of an image on said non-player character that is different between when said target character is in the ineffective state and when said target character is in the effective state, wherein said target character is switched, without any additional action from the user, to the ineffective state when a prescribed position is stored in said at least one player character position storage location when said target character is in the effective state.

18. A non-transitory computer-readable storage medium storing a game program for allowing a game apparatus provided with at least a display, a controller, and a processor to function as a game apparatus in which a user plays a game by operating said controller to control a player character to attack a target character displayed on said display, wherein said game program causes the processor of said game apparatus to execute:

controlling switching of said target character between an ineffective state of being never damaged even if an attack directly hits the target character, and an effective state of being damaged if an attack directly hits the target character;

displaying an image on said display that is different between when said target character is in the ineffective state and when said target character is in the effective state; and determining at least whether or not the player character is in a state of being continuously damaged, wherein said controlling switches, without any additional action from the user, said target character to the ineffective state when said determining determines that the player character is in the state of being continuously damaged when said target character is in the effective state.

19. A target control method of controlling a target character by a computer of a game apparatus in which a user plays a game by operating a controller to control a player character to attack said target character displayed on a display, including:

controlling switching of said target character between an ineffective state of being never damaged even if an attack directly hits the target character, and an effective state of being damaged if an attack directly hits the target character;

displaying an image on said display that is different between when said target character is in the ineffective state and when said target character is in the effective state; and determining, using the computer, at least whether or not the player character is in a state of being continuously damaged, wherein in said controlling, said target character is switched, without any additional action from the user, to the ineffective state when it is determined in said determining that the player character is in the state of being continuously damaged when said target character is in the effective state.

* * * * *